United States Patent [19]
Goodman

[11] Patent Number: 5,132,915
[45] Date of Patent: Jul. 21, 1992

[54] DOCUMENT DISPENSING APPARATUS AND METHOD OF USING SAME

[75] Inventor: Sidney R. Goodman, La Jolla, Calif.

[73] Assignee: Postal Buddy Corporation, San Diego, Calif.

[21] Appl. No.: 428,864

[22] Filed: Oct. 30, 1989

Related U.S. Application Data

[63] Continuation-in-part of Ser. No. 284,065, Dec. 13, 1989, Pat. No. 5,029,099.

[51] Int. Cl.$^5$ ............................................... G06F 15/46
[52] U.S. Cl. ...................................... 364/479; 364/471; 364/189; 235/381
[58] Field of Search ............... 364/479, 468, 471, 188, 364/519, 189, 469; 101/4, 47, 93.07; 222/93.07; 235/381

[56] References Cited

U.S. PATENT DOCUMENTS

| | | | |
|---|---|---|---|
| 4,495,582 | 1/1985 | Dessert et al. | 364/469 |
| 4,677,565 | 6/1987 | Ogaki et al. | 364/479 |
| 4,839,829 | 6/1989 | Freedman | 364/519 |
| 4,852,013 | 7/1989 | Durst, Jr. et al. | 364/478 |
| 4,873,643 | 10/1989 | Powell et al. | 364/468 |

*Primary Examiner*—Jerry Smith
*Assistant Examiner*—Paul Gordon
*Attorney, Agent, or Firm*—Bernard L. Kleinke; Jerry R. Potts; William Patrick Waters

[57] ABSTRACT

A self service system for vending small customized documents, includes an input device for receiving and storing customized input information from a customer for producing and vending a customized document according to the requirements of the customer. In response to the receipt of the customized input information, a device generates and supplies cost information to the customer. Responsive to signals indicative of the correct payment being received from the customer, a device produces the customized documents.

11 Claims, 4 Drawing Sheets

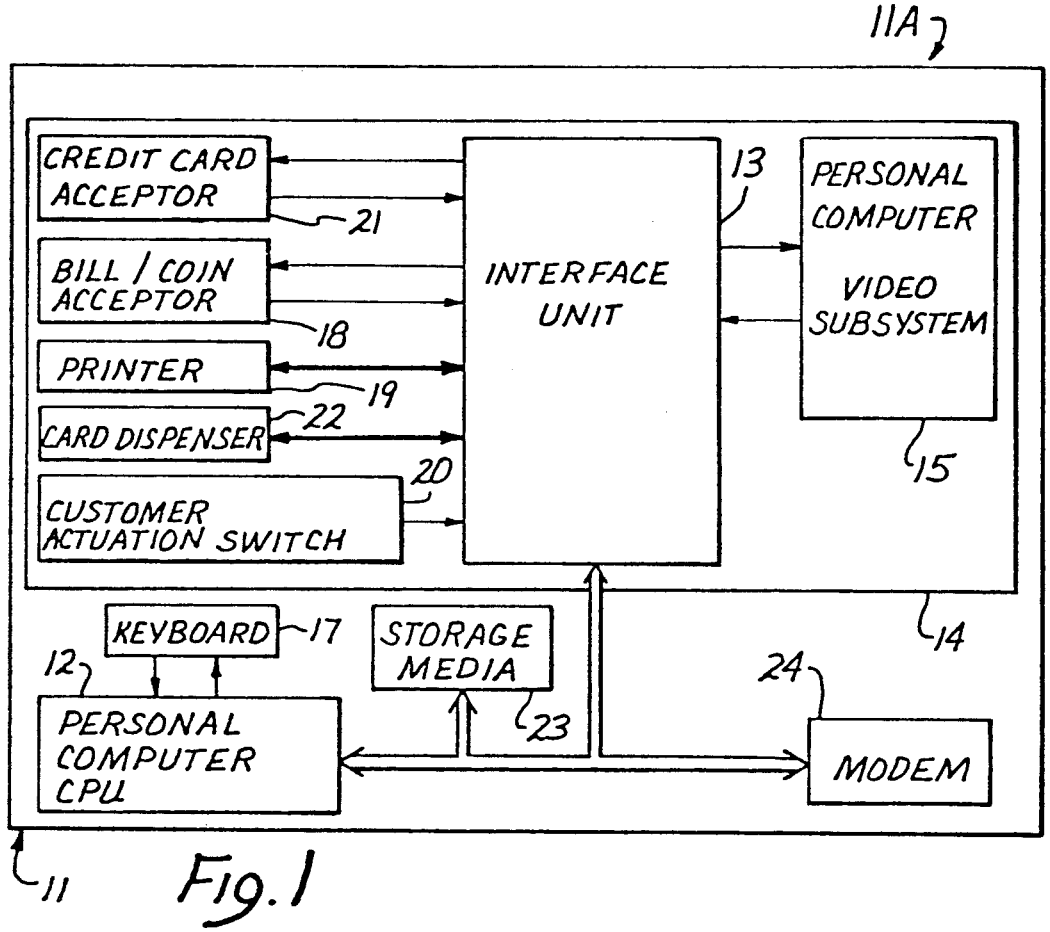
Fig. 1
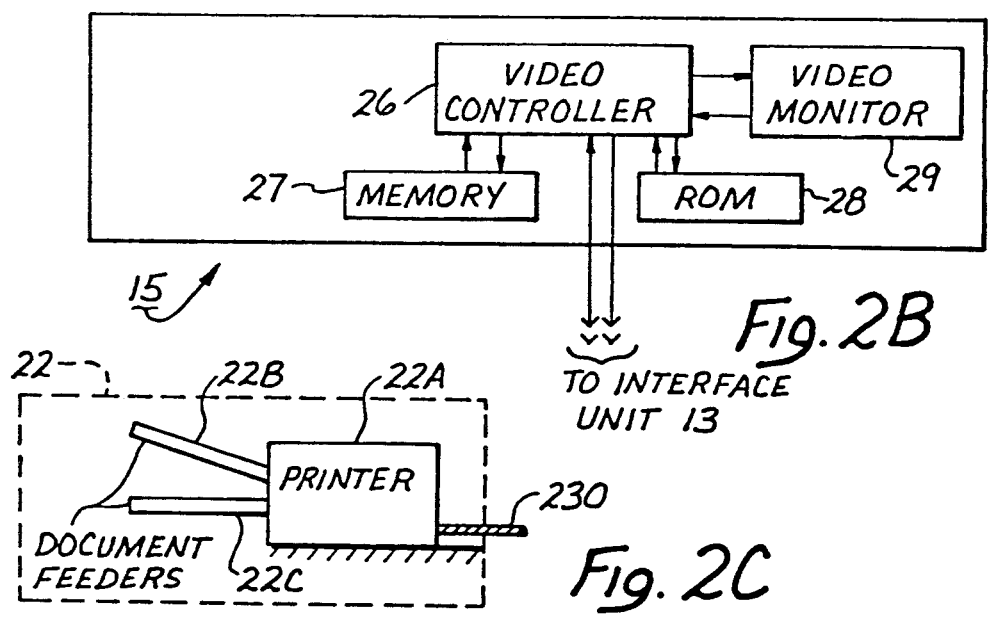
Fig. 2B
Fig. 2C 5,132,915

DOCUMENT DISPENSING APPARATUS AND METHOD OF USING SAME

CROSS REFERENCE TO RELATED APPLICATIONS

This patent application is a continuation-in-part of U.S. patent application Ser. No. 07/284,065 filed Dec. 13, 1989, and now U.S. Pat. No. 5,029,099. U.S. patent application Ser. No. 07/429,790, filed Oct. 30, 1989, entitled "CHANGE OF ADDRESS SYSTEM AND METHOD OF USING SAME", and U.S. patent application Ser. No. 07/429,658, filed Oct. 30, 1989, entitled "FOREIGN CHARACTER TERMINAL AND METHOD OF USING SAME", are being incorporated herein by reference and being assigned to the same assignee.

TECHNICAL FIELD

This invention relates in general to a document vending system and method of using it. The invention more particularly relates to a self-service system for vending small customized documents, such as business cards, change of address post cards, wedding invitations, and the like.

BACKGROUND ART

Modernly, there are numerous service and product companies being formed on a daily basis. In this regard, it has become common place for the owners of such businesses to advertise their products and services immediately, in order to attract a customer base. Such advertisements, however, are usually expensive, and thus for the smaller businesses, may become cost prohibitive. Therefore, most new and smaller businesses limit their initial advertising efforts to business cards, telephone advertisements, and other promotional techniques such as discount coupons and the like.

While such advertising efforts may have been generally satisfactory, the costs associated with even these advertising promotions has limited many businesses in their marketing efforts. For example, in order for a business to obtain new business cards, advertising cards, or the like, the owner or proprietor of the business in usually required to order a minimum number of the small sized cards, usually in the range of 500 to 1,000 cards. These minimum quantities are usually required, because the printing establishments preparing the small documents, must recoup printing set-up costs in customizing large numbers of small documents, such as business cards.

Moreover, the equipment utilized by the printing establishment is complex in order to handle the printing of large numbers of such small documents. In this regard, the investment made in acquiring such specialized equipment must also be recovered, each time it is used. Thus, new businesses or existing small businesses, are required to purchase a relatively large number of small documents such as flyers, discount coupons or business cards, for their advertising efforts, even though many of the documents may not be needed by the purchaser, and thus may go unused. Notwithstanding, the customer is required to pay for the large minimum number of the small documents, and spend additional sums of money for the excess documents.

Therefore, it would be highly desirable to be able to supply a user with a small quantity of customized documents, at a relatively inexpensive cost.

Another problem associated with a small business utilizing small customized documents, is the delays associated with obtaining such documents. Usually a printing establishment requires at least one business day or more, to complete an order for customized, small documents.

Therefore, it would be highly desirable to supply a customer with small customized documents in a very fast and convenient manner.

In this regard, it would be desirable to enable a person to receive the order for the documents in less than a day, and even during off hours, such as during the evenings, or weekends.

DISCLOSURE OF INVENTION

Therefore, the principal object of the present invention is to provide a new and improved document vending system, which facilitates the printing of small customized documents, in a convenient and efficient manner, and which enables a person to purchase a very small quantity, such as ten copies, in a cost effective manner.

Another object of the present invention is to provide such a new and improved document vending system and method, particularly useful in preparing multiple numbers of smaller customized documents, such as business cards, in a very fast, inexpensive and efficient manner, even during off-hours and weekends.

Briefly, the above and further objects of the present mention are realized by providing a new and improved method and system for vending small customized documents such as business cards, changes of address post cards or the like, in a relatively fast, convenient and inexpensive manner.

The document vending system includes a document vending terminal or station which may be conveniently and easily installed at any public location. In the preferred form of the invention, the system is used to produce and to vend customized small documents. In such an arrangement, there is provided a self service document terminal which includes a data processing computer, which is used by the customer in a self-service manner. A credit card acceptor mechanism, and a bill and coin acceptor mechanism, enables the customer to pay for the use of the vending system. A video display presents sales and inquiry information for the customers. A paper feeding mechanism and a printer dispensing mechanism furnish the customer with the customized small documents ordered.

In its operation, the system carries out the following steps for producing and vending the customized documents:

1. Queries from a customer are accepted by the self service document vending terminal as to which the type of small document needed;
2. The terminal solicits any necessary information from the customer in order to answer the queries;
3. Customer information and queries are transmitted to the data processing computer;
4. Relevant data is transmitted from the data processing computer regarding quantities, type styles, etc. and transmitted to the video terminal for responding to the customer;
5. If the customer elects to make a purchase of the customized documents, such as business cards, in response to the data received, the system receives the customer's monetary remittance either in cash or by credit card, and returns the required change, if any, to the customer; and 6. On receipt of the appropriate monetary remittance, whether by cash or credit card, the requested customized documents are dispensed to the customer.

The system saves considerable money and time for the customer. In this regard, the customer is not required to order a large minimum number of small documents. Instead, the customer is required to order only a minimum single sheet document which may be separated into a multiple number (e.g., ten) of small documents. Such multiple number may be as small as ten, without having to charge a premium for the small quantity. Moreover, the customer may obtain the desired customized documents at any time, day or night, and even on the weekends. The terminals are located at convenient locations.

The terminal computer processing unit stores information on the types of documents, styles and prices for vending the customized documents which may be requested and dispensed. This processing unit is also programmed to gather a predetermined sequence of information from a customer regarding the customized documents (business cards, postcards, etc.) that the customer desires. The information entered and gathered at the terminal is processed and transmitted via a video monitor to display quotation and other pertinent information to the customer that enables the terminal to process the document request initiated by the customer. Subsequently, the terminal is programmed to accept an order from the user for the offered customized documents, to collect payment, either by credit card or cash, and to vend the requested materials to the customer.

Thus, a customer is asked pertinent questions regarding information necessary to process a quotation for the type of small documents need, (business cards, postcards, etc.), the customer has selected. The gathered information is sent to the terminal computer where the quotation is processed and transmitted back to the video monitor. The customer is then given an opportunity to purchase the selected items. If a set of business cards, postcards, etc. are desired, the system accepts the customer's payment, verifies the correct amount has been received, returns any necessary change, and prints and vends the requested documents with the information provided by the customer.

In view of the foregoing, the system of the present invention enables customized small documents to be prepared and supplied to the customer while the customer waits, in a matter of minutes. Since the document vending system can easily determine the type and quantity of customized documents produced according to fixed parameters, the prepared documents can be accounted for and are thus, charged to the customer in a fast, convenient, self service mode of operation.

BRIEF DESCRIPTION OF DRAWINGS

The above mentioned and other objects and features of this invention and the manner of attaining them will become apparent, and the invention itself will be best understood by reference to the following description of the embodiment of the invention in conjunction with the accompanying drawings, wherein:

FIG. 1 is a block diagram of a small document vending system according to the present invention;

FIG. 2B is a block diagram of the video subsystem of FIG. 1;

FIG. 2C is a block diagram of the card dispenser unit of FIG. 1;

BEST MODE FOR CARRYING OUT THE INVENTION

Figure 2:
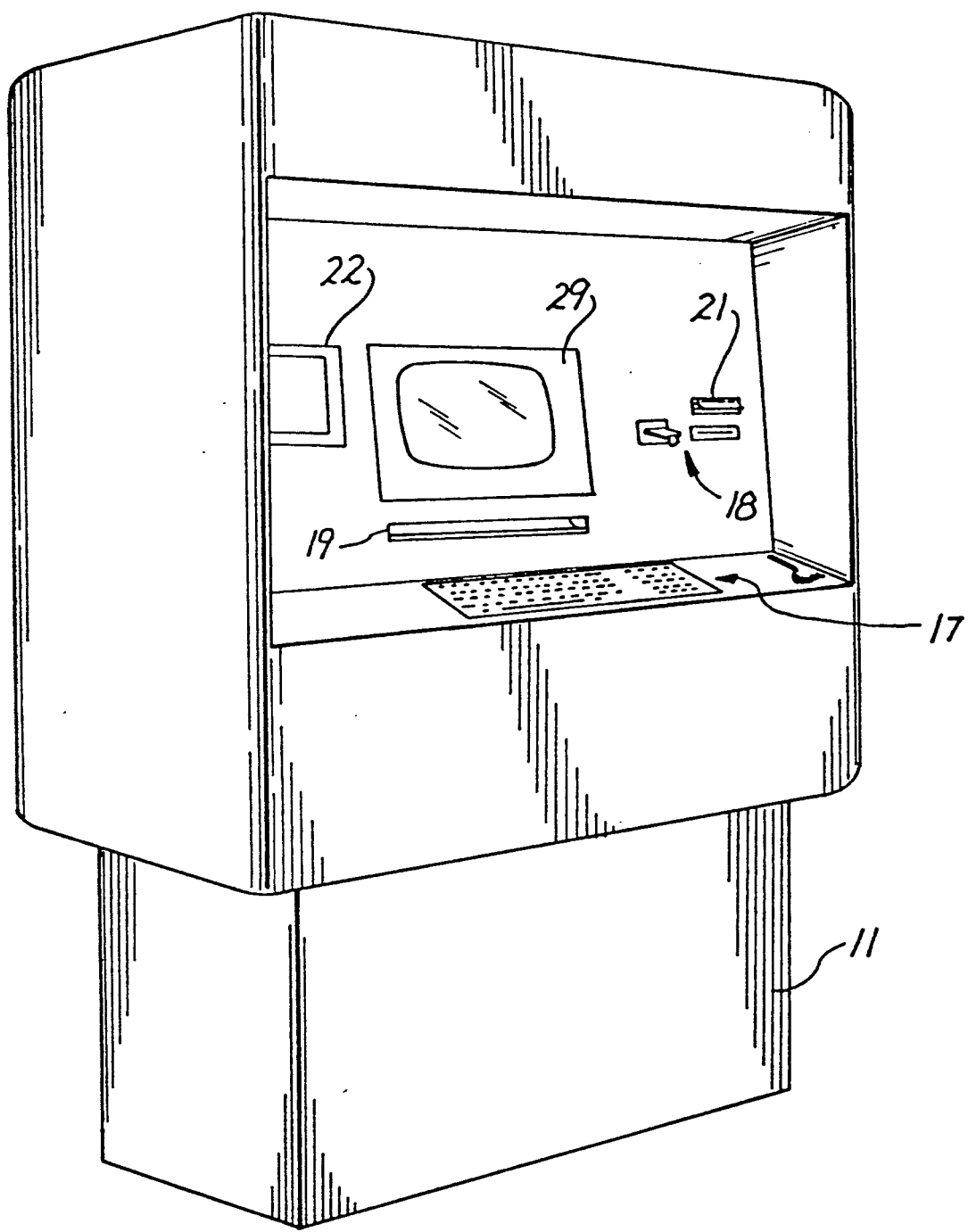
FIG. 2 is a pictorial view of the small document vending terminal of FIG. 1.

The following description is presented and organized according to the following outline:
A. HARDWARE DESCRIPTION
B. SYSTEM OPERATION
C. SYSTEM COMPUTER SOFTWARE
D. CUSTOMIZED DOCUMENTS

A. HARDWARE DESCRIPTION

Referring now to FIG. 1 of the drawings, there is shown a computerized document vending system 11A, which is constructed in accordance with the present invention and which is adapted to produce and to vend customized documents to a customer (not shown).

Considering now the inventive document vending system 11A, in greater detail with reference to FIG. 1, the system 11A generally includes a self service sales and information terminal housing 11 for enclosing personal computer CPU 12 and modem 24. The personal computer CPU 12 is an IBM PS-2 model M25 or equivalent and includes a video subsystem 15, keyboard 17 and a storage media unit 23. The video subsystem 15 includes a conventional video monitor 29. The video subsystem 15 is manufactured by IBM for use with the IBM PC-AT compatible personal computers.

The keyboard 17 is a customized keyboard for use with the IBM PC-AT type personal computer and is described in copending U.S. patent application Ser. No. 429,658, filed on Oct. 30, 1989. The personal computer CPU 12 is connected to an interface unit 13 for enabling a customer user of the system to solicit sales information and to purchase various types of printed documents in the form of change of address postcards and customized business cards, and other similar documents. The sales and information terminal 11 is installed at various convenient locations, such as post offices, shopping malls, and so on. In this regard, the terminal is designed to provide the same level of service as would a well informed sales representative and to interface with the customer by means of the communications and peripheral communication subsystem 14.

The interface unit 13 is also connected to the system peripherals that include a bill/coin acceptor 18, a printer 19, a credit card acceptor 21, a card dispenser 22, and a customer actuation switch 20.

The interface unit 13 enables the personal computer CPU 12 to sense the activation of a customer actuation switch 20 and to coordinate the operation of the bill/coin acceptor 18 and credit card acceptor 21 with the other peripheral units of the system 11A.

The basic customer information gathered at terminal 11 includes the name and address of the customer, and other relevant information pertaining to the type of document the customer desires to have prepared. For example, if a business card is to be prepared, the customer would supply the name and address of the business. The business telephone number, etc.

Once the basic customer information is gathered, the document vending system 11A produces a quotation for the customer's approval and, if accepted by the customer remitting payment either in cash or by credit card, vends the requested document(s).

C. SYSTEM COMPUTER SOFTWARE

The various programs for carrying out the operations of system 11A are of a "menu type" and can best be understood with reference to the foregoing mentioned co-pending U.S. patent applications.

D. CUSTOMIZED DOCUMENTS

Figure 2D:
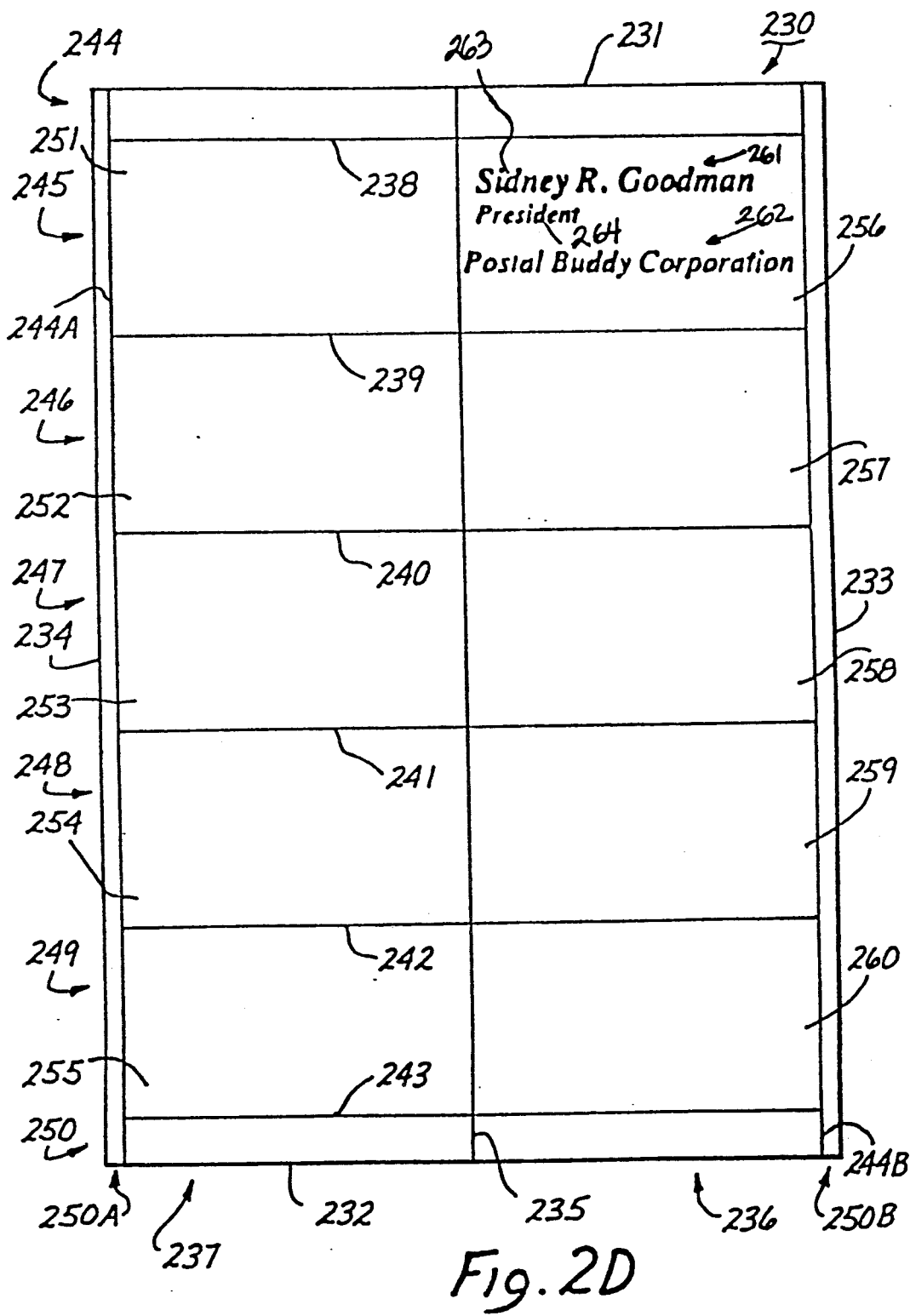
FIG. 2D is a face plan view of a sheet of customized small documents prepared by the document vending system of FIG. 1.
Figure 2E:
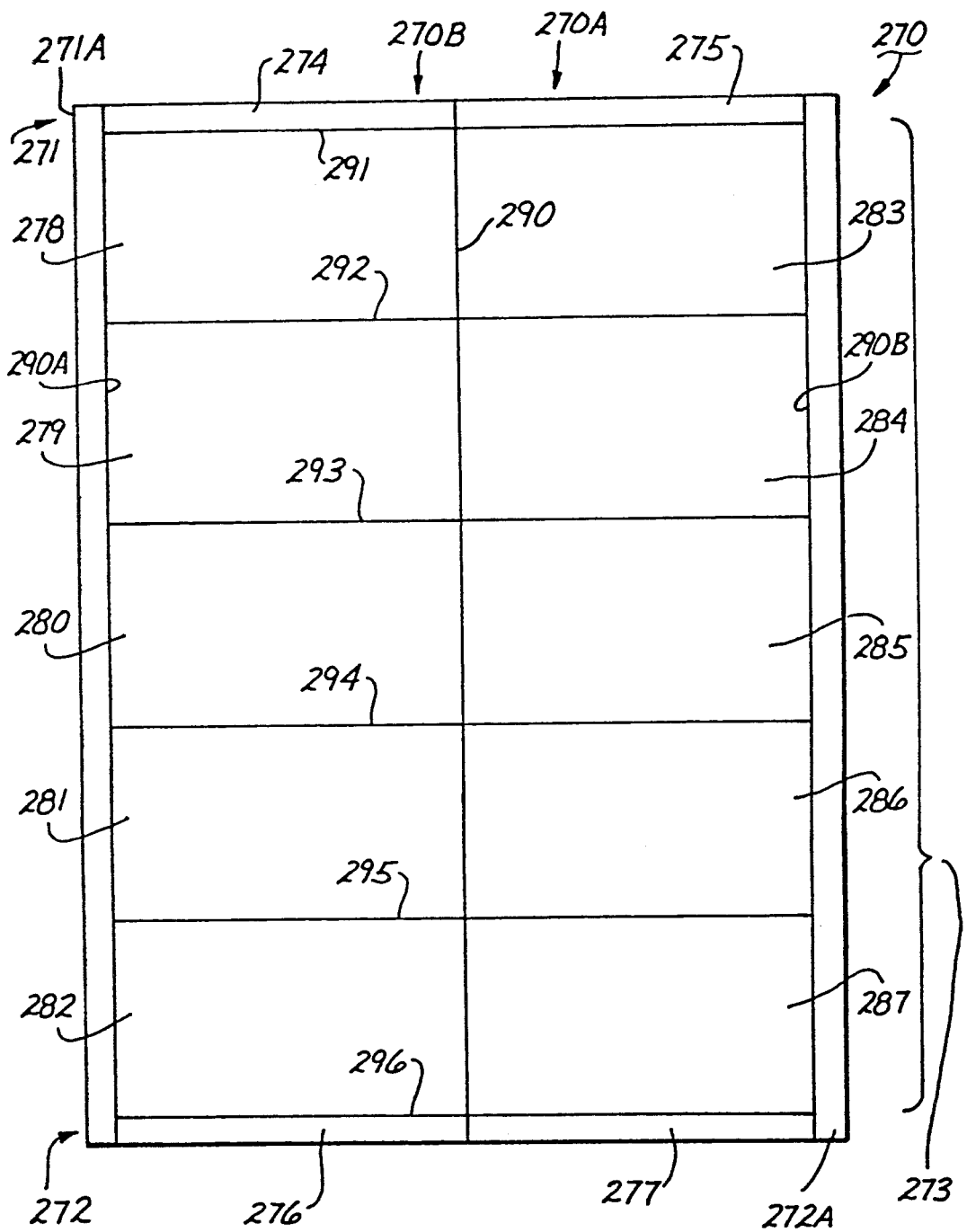
FIG. 2E is a face plan view of a blank sheet of paper stock use by the card dispenser mechanism of FIG. 2C to prepare the customized document of FIG. 2D.

Considering now the customized documents prepared by the document vending system 11A in greater detail with reference to FIGS. 2D and 2E, after the customer has remitted payment for his or her selected documents, the system software causes the card dispenser mechanism 22 to print and vend the customized documents ordered by the customer. In this regard, the card dispenser mechanism 22 includes a printer 22A for printing a customized document, such as document 230 shown in FIG. 2D. Printer 22A includes a pair of document feeders, such as document feeders 22B and 22C as shown in FIG. 2C. Document feeders 22B and 22C contain an inventory stock of pre-perforated paper such as a sheet 270 shown in FIG. 2E. It should be understood that various different pre-perforated paper inventory stock could be provided with the system depending on the type of small documents the system will vend. In the preferred embodiment of the present invention a inventory stock of single sheets of pre-perforated paper, such as sheet 270, is preferred.

Considering now the customized document 230 in greater detail with reference to FIG. 2C the customized document 230 in generally composed of a heavy weight paper typical used for preparing business cards and the like. The customized document 230 is generally rectangular in shape have a upper edge portion 231, a lower edge portion 232 and a pair of side portions 233 and 234. A vertical perforation line 235 that includes a multiple number of micro-perforations extends from the upper edge portion 231 to the lower edge portion 232. The vertical perforation line 235 subdivides the customized document 230 into a right side portion 236 and a left side portion 237.

The customized document 230 also includes a set of equally spaced apart horizontal preformation lines 238, 239, 240, 241, 242, and 243 respectively. Each of the horizontal perforation lines 238-243 include a multiple number of micro-perforations which extend from the right side portion 244A to the left side portion 244B to subdivide the customized document 230 into seven (7) portions shown generally at 244-250.

The customized document 230 also includes a pair of spaced apart vertical perforation lines 244A and 244B which also extend from the upper edge portion 231 to the lower edge portion 232. Vertical perforation line 244A is disposed adjacent and parallel to edge 234 of document 230 to form a left stud portion 250A. Similarly the vertical perforation line 244B is disposed adjacent and parallel to edge 233 of document 230 to form a right stud portion 250B.

The vertical perforation line 235 intersects each of the horizontal perforation lines 238-243 to divide each perforation line 238-243 into two equal parts to form twelve (12) document portions 251-260 and 250A and 250B. Each document portion 251-260 is substantially identical and only document portion 256 will be described herein after in greater detail.

Considering now document portion 250A in greater detail with reference to FIG. 2D, document portion 250 is generally rectangular in shape and is removable from document 230 when document 230 is folded along line 244A. In this regard portion 250A may be torn from the left portion 237. Similarly when document 230 is folded along 244B the portion 250A may be torn from the right portion 236.

Considering now document portion 256 in greater detail with reference to FIG. 2D, document portion 256 is generally rectangular in shape and includes disposed thereon two grouping of indicia 261 and 262. Indicia 261 and 262 are in the form of characters, symbols and signs which define a group of letters used in the english language. Indicia 261 includes three two types of indicia: bold indicia 263 and small indicia 264. The bold indicia 263 is more pronounced or darker than the small indicia 264. In addition, the bold indicia 263 is larger in size that the small 264. In this regard, the indicia 261 has been customized not only with the name of the customer, but also customized as to style. Indicia 262 is similar to indicia 264 and will not be described hereinafter in greater detail.

Considering now the blank sheet of paper stock 270 in greater detail with reference to FIG. 2E, the blank sheet of paper stock 270 is substantially identical to the customized document 230 except it does not include the indicia grouping, such as indicia 261 and 262. In this regard, it contains a centrally disposed vertical perforation line 290, a pair of equally spaced apart vertical perforation lines 290A and 290B and a set of horizontal perforation lines 291-296. It should be noted however, that the paper stock 270 is so constructed that it may be separated or torn into two groupings of equal sized small: a small grouping 271 and 272 a stud group 271A and 272A, and a large grouping shown generally at 273.

The small grouping 271 contains two small documents 274 and 275 while small grouping 272 contains two small documents 276 and 277. Similarly the large grouping 273 contains ten (10) documents shown generally at 278-287, which are substantially larger than documents 274-277.

In order to separate the blank sheet 270 into the separate documents 274-287 a user or customer of the small document vending machine folds the document 270 along line 290 and tears the document 270 along line 290 to divide the document 270 into two parts, a right part 270A and a left part 270B. The user then separates either the right part 270A or the left part 270B into its component small documents. As the method for separating the right or left parts into small documents is substantially identical only the method of separately the right part 270A will now be considered in greater detail.

Considering now the method of separating the right part 270A into small documents in greater detail with reference to FIG. 2E, the user first folds the document along perforation line 290B and separates the right stud portion 272A from the remaining right side portion. The user may then choose any one of horizontal fold lines for commencing the separating operation. For example, the user may start a line 291 by fold the small document along line 291 and then tearing the document 275 from document 283. Document 283 is then folded along line 292 and torn from document 284. Document 284 is then folded along line 293 and torn from document 285. Document 285 is then folded along lone 294 and torn from document 286. Document 286 is then folded along line 295 and thorn from document 287. Document 287 is then folded along line 296 and torn from document 277. In this manner the user or customer obtain seven small documents 275 and 277 composed of one size and documents 283-287 composed of another size.

In view of the foregoing it should be understood that various sized small documents may be easily and convenient prepared in an extremely fast and efficient manner. For example, the card dispensing mechanism is capable of preparing eight sheets of customized documents, such as document 230, per minute. In this regard, if a blank paper stock in the form of sheet 270 was utilized a customer could be vended, after entering the appropriate customer information approximately eighty (80) business cards per minute. It should be understood that the customer or user would only need to purchase one customized document.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. A system for vending customized documents comprising:
    a group of substantially identical single sheets of paper stock;
    means for storing said group of single sheets of paper stock in a stacked arrangement for sheet feeding purposes;
    each one of said single sheets of paper stock including means defining preformed microperforations to facilitate forming smooth edge documents when the single sheet is separated into a group of small documents;
    said means defining microperforations including a single centrally disposed longitudinally extending line of microperforations for helping to facilitate the separation of each one of said sheets into a group of individual strips and a plurality of equally spaced transversely extending lines of microperforations for helping to facilitate the separation of said strips into a plurality of individual small documents areas each having substantially the same size and shape;
    customer actuated terminal means for gathering customized information from a customer to prepare a small quantity of substantially identical customized documents and quantity information indicative of the number of documents to be made;
    means for storing the gathered information;
    printer means for printing a plurality of customized documents within said plurality of small document areas on an individual one of said sheets;
    said terminal means including sheet feeding means for feeding individual ones of said sheets of paper stock from said means for storing to said printer means;
    means for displaying required payment information to the customer;
    payment means for receiving a payment from the customer and for generating a document vending initiation signal;
    means responsive to said signal for causing said printer means to deposit indicia onto each one of said plurality of identical document areas, said indicia being indicative of the customized information composed by said customer and being deposited.

2. A system according to claim 1 wherein said customer actuated terminal means includes processor means for calculating product quotations for printing said small quantity of customized documents.

3. A system according to claim 1 wherein said customer actuated terminal means further includes a dispensing device for vending individual ones of said sheets of paper stock including customized indicia thereon.

4. A system according to claim 1 wherein said customer actuated terminal means comprises:
    means for receiving and storing document pricing information for generating messages for use by the customer; and
    means for gathering basic customer information concerning the type of customized document to be prepared and the quantity thereof for facilitating the vending of said customized documents.

5. A system according to claim 4 wherein said means for gathering basic customer information includes means for determining service quotations for using the system to print a given quantity of customized documents; means for determining customer acceptance of said quotations; and means for vending customized documents upon payment of the quotation amount by said customer.

6. A system according to claim 4 wherein said means for gathering basic customer information includes video display means for displaying customer messages and an input keyboard for entering data from said customer;
    means for determining the acceptance of an offered quotation for a selected number of customized documents, said means for determining generating a signal indicative of the acceptance of said quotation; and
    means responsive to said signal for determining the receipt of the correct payment corresponding to said quotation.

7. A document vending terminal comprising:
    customer actuated input means for receiving customer composed document information for a customized document to be produced repeatedly, said customized document having a content composed at the discretion of the customer independently of any data information stored in the system;
    means responsive to said customer actuated input means for generating and supplying to the customer, cost information for using the terminal to produce a given quantity of said customized document;
    means responsive to receipt of payment to sue the system for generating signals indicative of the amount of payment received for producing the customized document to be produced;
    printer means for depositing indicia to a plurality of identical document areas on a single sheet of paper stock;
    said plurality of identical document areas being defined by a plurality of micro-perforations for helping to separate said sheet into a multiple number of small customized documents;

means responsive to said signals indicative of payment being received for retrieving the customer composed document information;

means responsive to said retrieved information for causing said printer means to deposit indicia to each one of said plurality of identical document areas, said indicia being indicative of the customer composed document information.

8. A document vending terminal according to claim 7 wherein said input means includes a personal computer and a computer keyboard forming part of said personal computer.

9. A document vending terminal according to claim 8 wherein said personal computer includes a computer processor unit coupled in communication with said keyboard.

10. A document vending terminal according to claim 7 further including credit card acceptor means for accepting payment by a given customer and document vending means for printing and vending customized documents.

11. A method for vending customized documents, comprising:

storing a group of substantially identical signal sheets of pre-perforated paper stock in a stacked arrangement for sheet feeding purposes;

gathering customer composed customized information to prepare a small quantity of substantially identical customized documents;

storing the gathered information;

feeding at least one of the individual ones of the single sheets of pre-perforated paper stock from said stacked arrangement to printer means;

display required payment information to a customer;

receiving a customer payment to generate a document vending signal;

responding to said document vending signal by causing said printer means to deposit indicia indicative of the gathered customer composed customized information to a plurality of identical document areas on individual ones of said single sheets of paper stock.

* * * * *